G. WIARD.
Field-Rollers.

No. 154,624. Patented Sept. 1, 1874.

Witnesses: Jno. J. Bonner, Edward Wilhelm

Geo. Wiard, Inventor
by Jay Hyatt, Atty.

UNITED STATES PATENT OFFICE.

GEORGE WIARD, OF EAST AVON, NEW YORK, ASSIGNOR OF ONE-HALF HIS RIGHT TO C. W. HOUGH, OF SAME PLACE.

IMPROVEMENT IN FIELD-ROLLERS.

Specification forming part of Letters Patent No. 154,624, dated September 1, 1874; application filed February 25, 1874.

*To all whom it may concern:*

Be it known that I, GEORGE WIARD, of East Avon, in the county of Livingston, in the State of New York, have invented certain Improvements in Field-Rollers, of which the following is a specification:

My improvements relate generally to that class of rollers which consist of two cylinders or sections arranged in line, each of which revolves on independent journals; but more especially my invention relates to the peculiar manner of forming the bearings for the journals at the inner ends of the sections.

Figure 1:
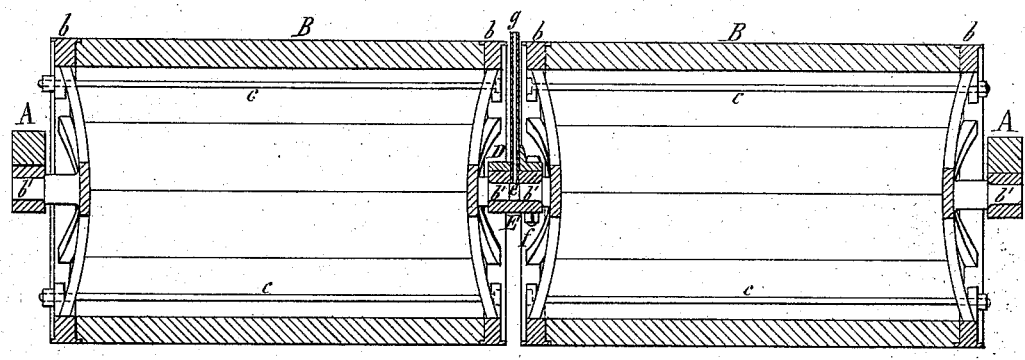
Figure 2:
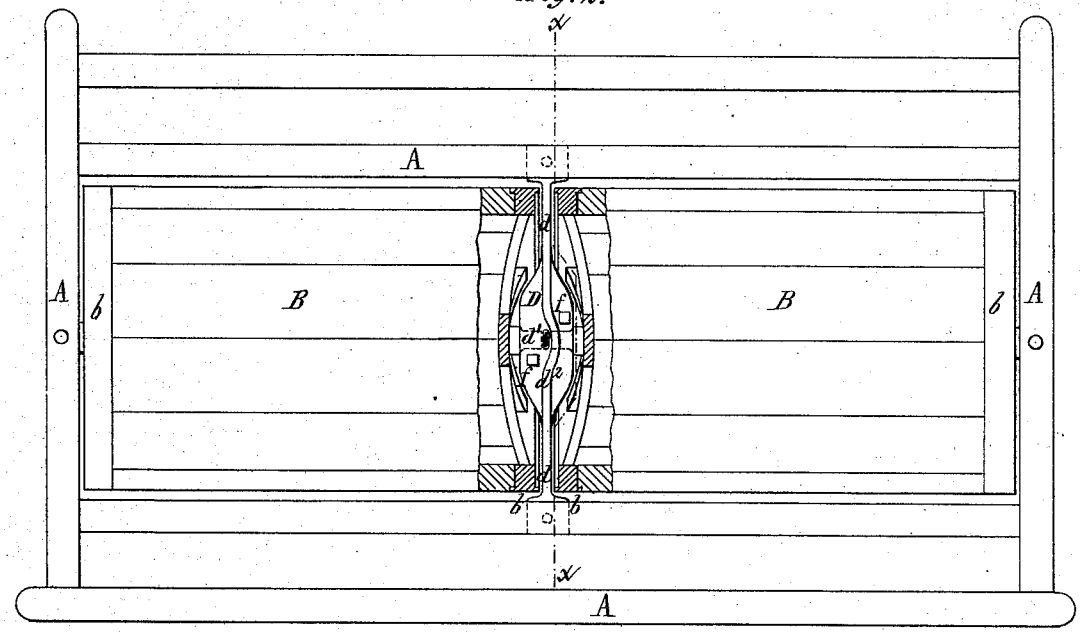
Figure 3:
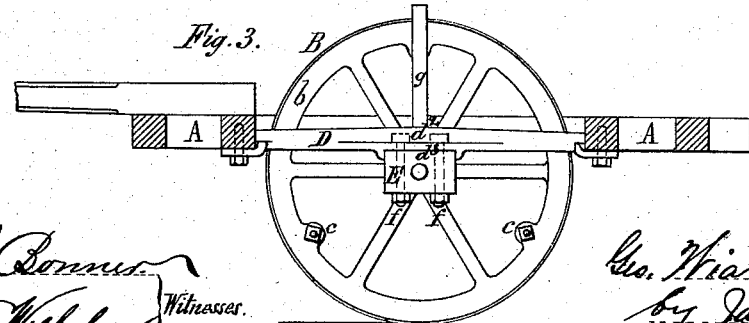

In the accompanying drawings, Figure 1 is a longitudinal vertical section. Fig. 2 is a bottom plan, with a portion of the inner ends of the rollers broken away. Fig. 3 is a vertical section in line $x\ x$, Fig. 2.

Like letters of reference designate like parts in each of the figures.

A is the frame, of ordinary construction; and B B, the two sections or rollers, arranged within the frame. $b\ b$ are the cast-iron heads, between which the planks forming the body of the roller are secured by means of tie-rods $c$. The heads $b$, made solid or of spider form, are cast concave on the outer surface, with gudgeons or journals $b'$ projecting from the center thereof. D is the central cross-piece, of iron, made laterally narrow at $d\ d$, so as to permit the peripheries of the ends of the two rollers to be brought as close together as practicable, while it is made of sufficient width vertically to give the cross-bar at this point the required strength and stiffness without interfering with the rollers. The central portion $d^1$ of this bar is enlarged or widened horizontally, so as to form a support of sufficient width for the attachment thereto of the boxes E of the journals of the inner ends of the rollers. The central portion of the cross-piece D is strengthened by a rib, $d^2$, on the upper side, which is, in fact, an extension of the upper portion $d$, while the lower side is provided with lugs, forming a recess, $d^3$, to receive and hold the boxes against lateral displacement. The cross-piece is secured at its ends to the under side of the frame by bolts, as clearly shown. These boxes I make of wood, on account of their greater durability, and fasten, preferably, to the under side of the cross-bar by bolts $f$. These boxes are made of sufficient width to receive the ends of both journals, as clearly shown in Fig. 2. $e$ is an oil-hole, extending upward through the cross-bar; and $g$ is an oil-tube, connecting at its lower end with this oil-hole, and extending upward between the ends of the rollers, so as to enable the lubricating-oil to be readily poured therein, which, discharging at the lower end between or upon the ends of the journals, lubricates both. By leaving a space between the ends of the journals, and filling it with any suitable packing material, and saturating it with oil, a lubricating-cup will thereby be formed, which will keep the journals properly lubricated for a considerable length of time without requiring a resupply of oil.

What I claim as my invention is—

1. The combination of the central cross-bar D, contracted in width laterally at $d$, and enlarged at the center $d^1$, with the rollers B B, provided with concave heads $b$ and journals $b'$, and arranged in line, with their abutting ends so nearly in contact as to practically form one continuous roller, as herein shown and described.

2. The combination, with the abutting rollers B B, concave heads $b$, journals $b'$, cross-bar D, provided with central lateral enlargement, and recess $d^3$, of the wooden box E, as herein shown and described.

GEORGE WIARD.

Witnesses:
M. L. GREEN,
ORVILLE HUTCHINSON.